(12) United States Patent
Eaton

(10) Patent No.: US 7,505,602 B2
(45) Date of Patent: Mar. 17, 2009

(54) MOBILE DEVICE WITH IMPROVED ACOUSTIC PORTING

(75) Inventor: W. Chris Eaton, Cary, NC (US)

(73) Assignee: Sony Ericsson Mobile Communications AB, Lund (SE)

(*) Notice: Subject to any disclaimer, the term of this patent is extended or adjusted under 35 U.S.C. 154(b) by 558 days.

(21) Appl. No.: 10/376,938

(22) Filed: Feb. 28, 2003

(65) Prior Publication Data

US 2004/0170291 A1 Sep. 2, 2004

(51) Int. Cl.
  *H04R 1/20* (2006.01)
  *H04M 1/00* (2006.01)
  *H04M 9/00* (2006.01)

(52) U.S. Cl. ............... 381/351; 381/345; 381/386; 455/575.1; 379/433.02

(58) Field of Classification Search ............... 381/163, 381/351, 352, 335, 345, 386; 379/433.02, 379/433.01; 455/575.1
See application file for complete search history.

(56) References Cited

U.S. PATENT DOCUMENTS

| | | | |
|---|---|---|---|
| 4,418,248 A | 11/1983 | Mathis | |
| 4,454,927 A * | 6/1984 | Seebinger | 181/152 |
| 4,727,583 A | 2/1988 | Weber | |
| 4,907,266 A | 3/1990 | Chen | |
| 5,058,154 A | 10/1991 | Andersen | |
| 5,155,773 A | 10/1992 | Hansen | |
| 5,333,463 A | 2/1993 | Hansen | |
| 5,333,206 A | 7/1994 | Koss | |
| 5,610,992 A | 3/1997 | Hickman | |
| 5,642,402 A | 6/1997 | Vilmi et al. | |

(Continued)

FOREIGN PATENT DOCUMENTS

EP 0 909 110 A2 4/1999

(Continued)

OTHER PUBLICATIONS

U.S. Appl. No. 10/065,330, Hansson.

(Continued)

*Primary Examiner*—Xu Mei
*Assistant Examiner*—Jason R Kurr
(74) *Attorney, Agent, or Firm*—Charles L. Evans; Matthew W. Witsil; Moore & Van Allen PLLC

(57) ABSTRACT

The present invention is directed to a mobile device with improved acoustic porting. The mobile device includes a housing that has at least one sound hole, a transducer for converting an electrical signal into an acoustical signal, and a grommet that engages the housing and the transducer to form an interior cavity. A passage acoustically couples the interior cavity with the interior of the housing. The transducer emits sound into the interior cavity. The sound travels from the interior cavity through the passage into the interior of the housing and then to the user's ear via the sound hole(s) in the housing. The passage may be any channel, tube, passageway, or pathway that allows an acoustical signal to travel from the interior cavity to the interior of the housing. The transducer may also emit sound into the interior of the housing that mixes with the sound traveling from the interior cavity through the passage into the interior of the housing.

22 Claims, 3 Drawing Sheets

U.S. PATENT DOCUMENTS

| | | | | |
|---|---|---|---|---|
| 5,790,679 | A * | 8/1998 | Hawker et al. | 381/163 |
| 5,883,966 | A * | 3/1999 | Kubo | 381/386 |
| 5,905,805 | A | 5/1999 | Hansen | |
| 6,002,949 | A * | 12/1999 | Hawker et al. | 455/569.1 |
| 6,064,894 | A | 5/2000 | Zurek et al. | |
| 6,144,738 | A | 11/2000 | Hawker et al. | |
| 6,154,666 | A | 11/2000 | Patterson et al. | |
| 6,239,393 | B1 | 5/2001 | Hansen | |
| 6,337,908 | B1 | 1/2002 | Andersen | |
| 6,526,150 | B2 * | 2/2003 | Kelly et al. | 381/353 |
| 6,668,063 | B2 * | 12/2003 | Cimaz et al. | 381/345 |
| 6,819,946 | B2 * | 11/2004 | Hansson | 455/569.1 |
| 6,876,743 | B2 * | 4/2005 | Asahina et al. | 379/433.02 |
| 2002/0051552 | A1 * | 5/2002 | Schott | 381/345 |

FOREIGN PATENT DOCUMENTS

| | | |
|---|---|---|
| EP | 1 001 547 A1 | 5/2000 |
| EP | 1 091 539 A2 | 4/2001 |
| JP | 3-28895 | 3/1991 |
| WO | WO 00/21330 | 4/2000 |
| WO | WO 01/33904 A1 | 5/2001 |

OTHER PUBLICATIONS

"Design of mobile and cordless hand-set offering a major improvement in sound quality" Kirk Acoustics, Horsens, Denmark, Sep. 1997.

"Leak Tolerant Dynamic Receivers Mobile and Cordless Telephone handset design", Kirk Acoustics A/S, Horsens, Denmark, Feb. 2000.

English translation of Office Action describing JP 3-28895, issued by the Japanese Patent Office, dated Apr. 4, 2008, 2 pages.

* cited by examiner

MOBILE DEVICE WITH IMPROVED ACOUSTIC PORTING

BACKGROUND

Mobile devices such as cellular telephones have sound holes in the housing of the device that function as a port to allow acoustic signals to travel from a transducer mounted within the housing to a user's ear. The exact size, shape, location, and number of sound holes are important with respect to the design, marketing, and visual appeal of the mobile device. For example, by arranging the sound holes in a particular pattern the holes may be used as a source identifier such as a trademark or to convey a particular look. However, the sound holes may also detract from the visual appeal of a device due to their size, location, or asymmetry, or they may pose a functionality issue if they are too small and tend to become obstructed by debris. The sound holes in a mobile device are designed so that the acoustic performance of the mobile device does not vary substantially regardless of whether the user is right-handed or left-handed or whether the user is listening with their right ear or left ear.

Presently, two or more sound holes are required in a mobile device containing transducers designed to have low acoustic impedance in order to obtain the desired frequency response necessary to achieve the optimum acoustical performance of the mobile device. The size, shape, location, and number of sound holes in a mobile device are also largely dependent upon the location of the transducer inside the mobile device.

SUMMARY

The present invention is directed to a mobile device with improved acoustic porting. The mobile device includes a housing that has at least one sound hole, a transducer for converting an electrical signal into an acoustical signal, and a grommet that engages the housing and the transducer to form an interior cavity. A passage is defined that acoustically couples the interior cavity with the interior of the housing. The transducer emits sound into the interior cavity. The sound travels from the interior cavity through the passage into the interior of the housing and then to the user's ear via the sound hole(s) in the housing.

The passage may be any channel, tube, passageway, or pathway that allows an acoustical signal to travel from the interior cavity to the interior of the housing. For example, the passage may be a channel that has been cut into the grommet or the interior surface of the housing. The transducer may also emit sound into the interior of the housing that mixes with the sound traveling from the interior cavity through the passage into the interior of the housing. The use of the passage provides additional flexibility with respect to the size, shape, location, and number of sound holes that are used to obtain the desired frequency response necessary to achieve the optimum acoustical performance of the mobile device.

DESCRIPTION OF THE INVENTION

Figure 1:
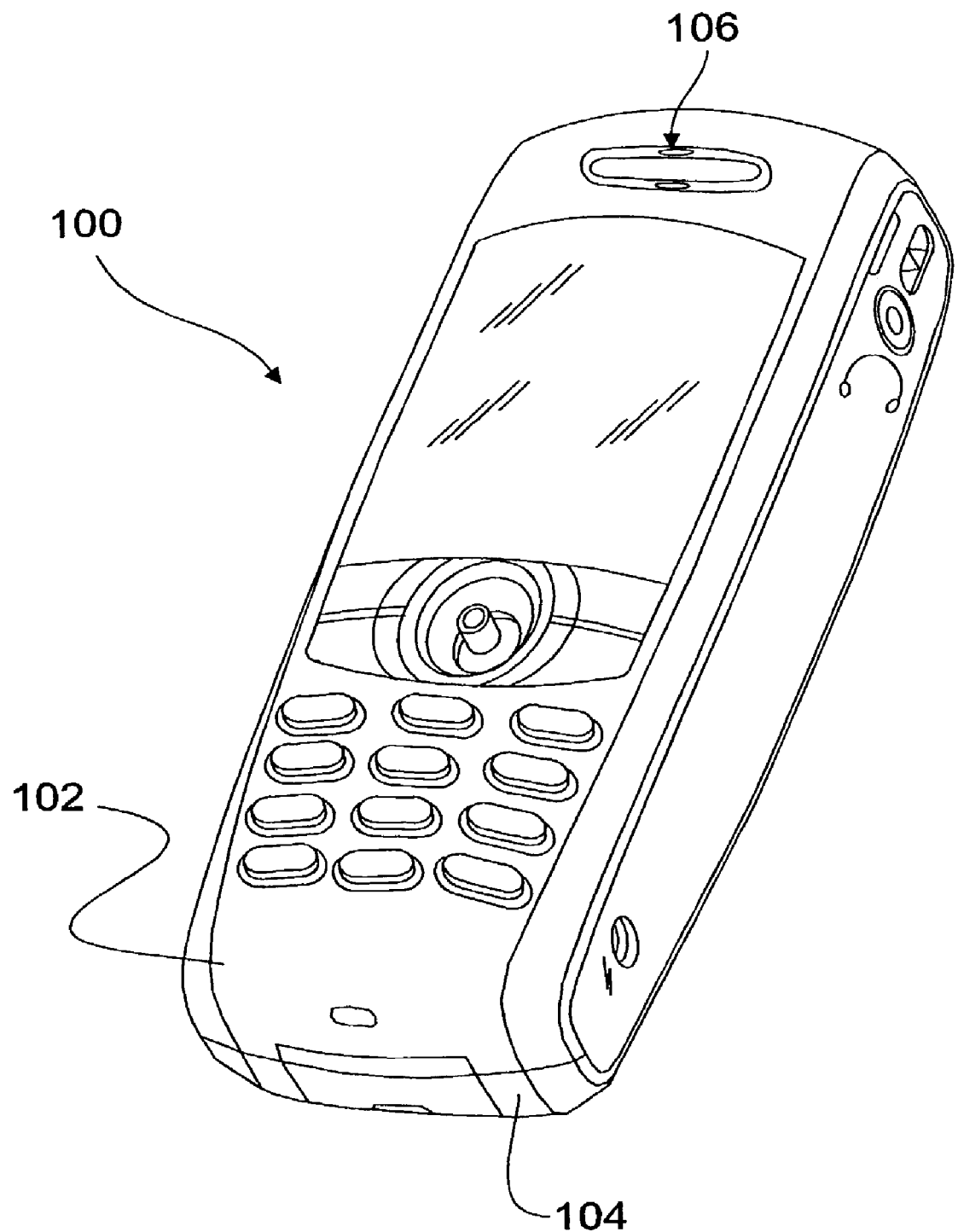
FIG. 1 illustrates a perspective view of one embodiment of a mobile device according to the present invention.

FIG. 1 illustrates a perspective view of one embodiment of a mobile device according to the present invention. The mobile device 100 includes a housing having a front cover 102 mounted to a back cover 104 to form an enclosure. The front cover 102 has one or more openings or sound holes 106 for porting acoustical signals or sound generated by a transducer that is disposed within the housing. For a mobile device having a transducer implementation according to the present invention, the exact size, shape, location, and number of sound holes 106 may vary.

Figure 2:
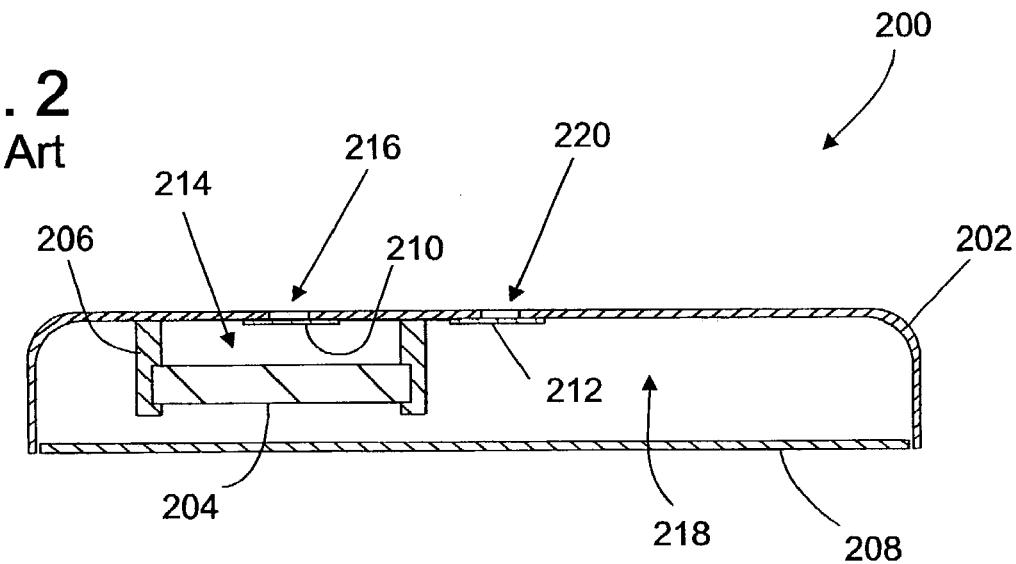
FIG. 2 illustrates a cross-sectional view of a prior art transducer implementation in a mobile device.

FIG. 2 illustrates a cross-sectional view of a prior art transducer implementation in a mobile device. For simplicity of illustration, only the upper half of the mobile device is shown. The mobile device 200 includes a front cover 202, a transducer 204, a grommet 206, a printed circuit board (PCB) 208, and two pieces of cloth 210 and 212.

The transducer 204 is inserted into a cavity forming member or grommet 206. The grommet 206 is secured to the inside front cover 202 of the mobile device using means that one of ordinary skill in the telecommunications or acoustic arts would quickly recognize. The combination of the transducer 204, grommet 206, and inside front cover 202 forms an interior cavity or front volume 214. The term "volume" as used throughout this description refers to a 3-dimensional space as opposed to a term referring to sound intensity. The front volume 214 is acoustically coupled with the front surface of the transducer 204. At least one front volume opening or sound hole 216 is provided in the front cover 202. The front volume sound hole 216 is acoustically coupled with the front volume 214. During normal use and operation of mobile device 200, the transducer 204 converts an electrical signal into a first acoustical signal at the front surface of the transducer 204. The first acoustical signal travels from the front surface of transducer 204 to the front volume 214 and then to the user's ear via the port provided by the front volume sound hole 216.

A printed circuit board 208 is included in the mobile device 200 that includes electrical and other components that are used during the use and operation of the mobile device 200. The printed circuit board 208 forms an interior wall and is mounted in the mobile device 200 using means that one of ordinary skill in the telecommunications or acoustic arts would quickly recognize. The combination of the front cover 202 and the printed circuit board 208 forms a housing interior cavity or back volume 218. The back volume 218 is acoustically coupled with the back surface of the transducer 204. At least one back volume opening or sound hole 220 is provided in the front cover 202. The back volume sound hole 220 is acoustically coupled with the back volume 218. During normal use and operation of mobile device 200, the transducer 204 converts an electrical signal into a second acoustical signal at the back surface of the transducer 204. The second acoustical signal travels from the back surface of the transducer 204 to the back volume 218 and then to the user's ear using the port provided by the back volume sound hole 220. Two pieces of cloth 210 and 212 are adhered to the inside front cover 202 over the front volume sound hole 216 and the back volume sound hole 220 to prevent debris from entering the inside of the mobile device.

Figure 3:
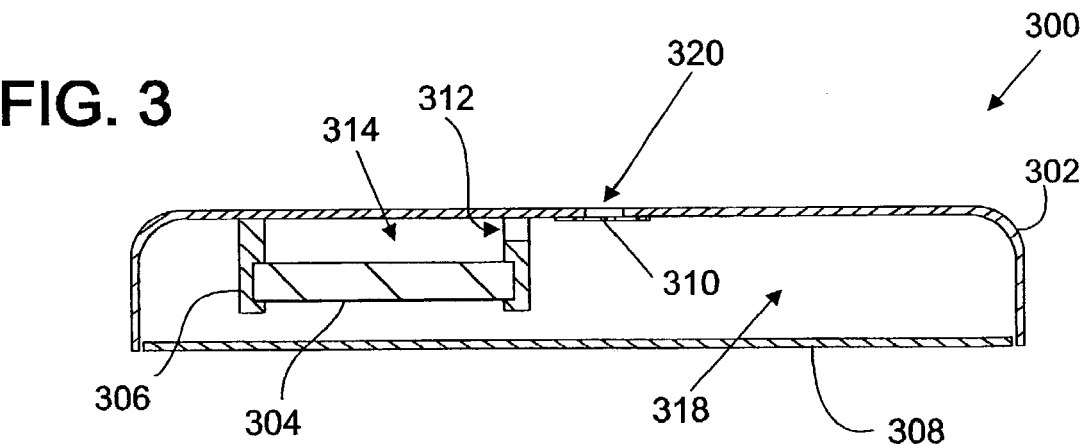
FIG. 3 illustrates a cross-sectional view of one embodiment of a transducer implementation in a mobile device according to the present invention.

FIG. 3 illustrates a cross-sectional view of one embodiment of a transducer implementation in a mobile device according to the present invention. For simplicity of illustration, only the upper half of the mobile device is shown. The mobile device 300 includes a front cover 302, a transducer 304, a grommet 306, a printed circuit board 308, and a piece of cloth 310.

The transducer 304 is a low acoustic impedance receiver that is inserted into a cavity forming member or grommet 306. The transducer may also be referred to as an electro-acoustic transducer. The grommet 306 is secured to the inside front cover 302 of the mobile device using means that one of ordinary skill in the telecommunications or acoustic arts would quickly recognize. The combination of the transducer 304, grommet 306, and inside front cover 302 forms an interior cavity or front volume 314. The front volume 314 is acoustically coupled with the front surface of the transducer 304. It should be understood that the front volume 314 may be enclosed by other components that are either integral with or attached to the transducer 304 and that the formation of the front volume 314 is not limited to the combination of the transducer 304, grommet 306, and inside front cover 302. The front volume 314 may be formed using other means that one of ordinary skill in the telecommunications or acoustic arts would quickly recognize. The size of the front volume may be dictated by the space available above the transducer 304 or by the ability to fit and seal the grommet 306 to the front cover 302; however, it is generally good practice to maximize the size of the front volume 314.

A printed circuit board 308 is included in the mobile device 300 that includes electrical and other components that are used during the use and operation of the mobile device 300. The printed circuit board 308 forms an interior wall and is mounted in the mobile device 300 using means that one of ordinary skill in the telecommunications or acoustic arts would quickly recognize. The combination of the front cover 302 and the printed circuit board 308 forms a housing interior cavity or mixing volume 318. The mixing volume 318 is acoustically coupled with the back surface of the transducer 304. It should be understood that the mixing volume 318 may be enclosed by other components such as the back cover 104 as shown in FIG. 1 and that the formation of the mixing volume 318 is not limited to the combination of the front cover 302 and the printed circuit board 308. The mixing volume 318 may be formed using other means that one of ordinary skill in the telecommunications or acoustic arts would quickly recognize. The size of the mixing volume 318 should be maximized since better acoustical results are realized using a larger mixing volume. To increase the size of the mixing volume 318, holes may be included in the printed circuit board 308 to access any additional volumes that may be available in the interior of the housing. At least one mixing volume opening or sound hole 320 is provided in the front cover 302. The mixing volume sound hole 320 is acoustically coupled with the mixing volume 318. The mixing volume sound hole 320 delivers the sound generated by the mobile device 300 to a user's ear. The mixing volume sound hole 320 also affects the frequency response of the sound based on the size and shape of the hole. A piece of cloth 310 is adhered to the inside front cover 302 over the mixing volume sound hole 320 to prevent debris from entering the inside of the mobile device.

The mobile device 300 includes a passage or front volume tuning channel 312 that acoustically couples the front volume 314 to the mixing volume 318. The front volume tuning channel 312 may be any channel, tube, passageway, or pathway that allows an acoustical signal to travel from the front volume 314 to the mixing volume 318. For example, the front volume tuning channel 312 may be a passage or channel that is cut into the grommet 306 or it may be a channel, scoop, or depression that is cut into the front cover 302. As one of ordinary skill in the telecommunications or acoustic arts would quickly recognize, the exact size, shape, and dimensions of the front volume tuning channel 312 may vary depending on the various components utilized in the mobile device.

A front volume resonator is formed by the front volume 314 and the front volume tuning channel 312. Correct tuning of the front volume resonator by using the appropriate dimensions for the front volume tuning channel 312 will yield a resonator between 3 and 4 kHz. Acoustic modeling may be used to determine the exact size, shape, and dimensions of the front volume tuning channel 312 to minimize frequency roll-off past 1 kHz (so that the minimum deviation in level is 12 dB or less between 1 and 4 kHz) while maximizing sensitivity between 3 and 4 kHz. The front volume tuning channel 312 provides access to mixing volume 318 with very little internal restriction of the acoustical signal. If there is too much restriction of the acoustical signal, the value of the area of the channel as an acoustical port to the user's ear is diminished resulting in a low-pass frequency characteristic with roll-off before 3 kHz and less sensitivity overall.

During normal use and operation of mobile device 300, the transducer 304 converts an electrical signal into a first acoustical signal. The first acoustical signal travels from the front surface of transducer 304 to the front volume 314 and then through the front volume tuning channel 312 to the mixing volume 318. A second acoustical signal is also generated at the back surface of the transducer 304. The second acoustical signal travels from the back surface of the transducer 304 to mixing volume 318. The first acoustical signal and second acoustical signal are mixed in mixing volume 318 and travel to the user's ear using the port provided by the mixing volume sound hole 320. The size of the mixing volume sound hole (or holes) is based upon the minimum size necessary to give a frequency response that does not have a bass-boost response as measured on a Type 1 sealed artificial ear.

The use of a front volume tuning channel as described herein provides a variety of options to a mobile device designer regarding the size, shape, location, and number of sound holes that may be used to obtain the desired frequency response necessary to achieve the optimum acoustical performance of the mobile device. One or more sound holes may be used and the placement of the holes is not directly dependent on the location of the transducer within the mobile device.

Figure 4:
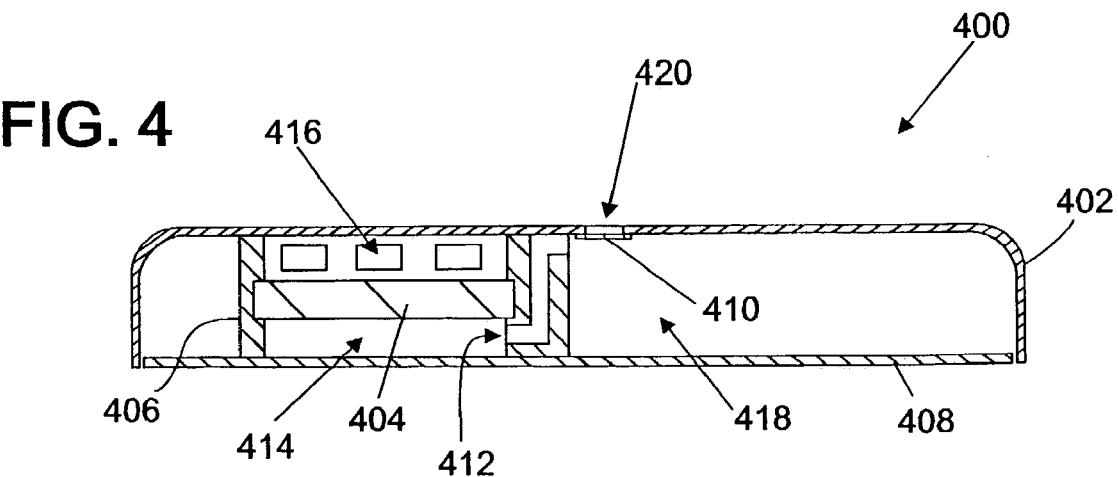
FIG. 4 illustrates a cross-sectional view of another embodiment of a transducer implementation in a mobile device according to the present invention.

FIG. 4 illustrates a cross-sectional view of another embodiment of a transducer implementation in a mobile device according to the present invention. For simplicity of illustration, only the upper half of the mobile device 400 is shown. The mobile device 400 includes a front cover 402, a transducer 404, a grommet 406, a printed circuit board 408, and a piece of cloth 410.

The transducer 404 is a low acoustic impedance receiver that is inserted into a cavity forming member or grommet 406. Transducer 404 and grommet 406 are characterized by a front surface and a back surface that oppose each other. The back surface of grommet 406 is secured to printed circuit board 408 using means that one of ordinary skill in the telecommunications or acoustic arts would quickly recognize. The printed circuit board 408 includes electrical and other components that are used during the use and operation of the mobile device 400. The printed circuit board 408 forms an interior wall and is mounted in the mobile device 400 using means that one of ordinary skill in the telecommunications or acoustic arts would quickly recognize. The combination of the transducer 404, grommet 406, and printed circuit board 408 forms an interior cavity or front volume 414. The front volume 414 is acoustically coupled with the back surface of the transducer 404. It should be understood that the front volume 414 may be enclosed by other components that are either integral with or attached to the transducer 404 and that the formation of the front volume 414 is not limited to the combination of the transducer 404, grommet 406, and printed circuit board 408. The front volume 414 may be formed using other means that one of ordinary skill in the telecommunications or acoustic arts would quickly recognize.

As shown in FIG. 4, a housing interior cavity or mixing volume 418 is formed by the combination of the front cover 402 and the printed circuit board 408. It should be understood that the mixing volume 418 may be enclosed by other components such as the back cover 104 as shown in FIG. 1 and that the formation of the mixing volume 418 is not limited to the combination of the front cover 402 and the printed circuit board 408. The mixing volume 418 may be formed using other means that one of ordinary skill in the telecommunications or acoustic arts would quickly recognize.

When the front cover 402 and the printed circuit board 408 are combined, the front surface of grommet 406 comes into contact with the front cover 402. The grommet 406 includes grommet openings 416 that allow sound to freely travel from the front surface of the transducer 404 into the mixing volume 418 thereby acoustically coupling the front surface of the transducer 404 to the mixing volume 418. At least one mixing volume opening or sound hole 420 is provided in the front cover 402. The mixing volume sound hole 420 is acoustically coupled with the mixing volume 418. The mixing volume sound hole 420 delivers the sound generated by the mobile device 400 to a user's ear. The mixing volume sound hole 420 also affects the frequency response of the sound based on the size and shape of the hole. A piece of cloth 410 is adhered to the inside front cover 402 over the mixing volume sound hole 420 to prevent debris from entering the inside of the mobile device.

The mobile device 400 includes a passage or front volume tuning channel 412 that acoustically couples the front volume 414 to the mixing volume 418. The front volume tuning channel 412 may be any channel, tube, passageway, or pathway that allows an acoustical signal to travel from the front volume 414 to the mixing volume 418. For example, the front volume tuning channel 412 may be a passage or channel that is cut into the grommet 406 or a tube or similar passageway from the front volume 414 to the mixing volume 418. As one of ordinary skill in the telecommunications or acoustic arts would quickly recognize, the exact size, shape, and dimensions of the front volume tuning channel 412 may vary depending on the various components utilized in the mobile device.

Acoustic modeling may be used to determine the exact size, shape, and dimensions of the front volume tuning channel 412 to minimize frequency roll-off past 1 kHz (so that the minimum deviation in level is 12 dB or less between 1 and 4 kHz) while maximizing sensitivity between 3 and 4 kHz. The front volume tuning channel 412 should provide access to the mixing volume 418 with very little internal restriction of the acoustical signal. If there is too much restriction, the value of the area of the channel as a port to the user's ear is diminished resulting in a low-pass frequency characteristic with roll-off before 3 kHz and less sensitivity overall.

During normal use and operation of mobile device 400, the transducer 404 converts an electrical signal into a first acoustical signal. The first acoustical signal travels from the front surface of transducer 404 through grommet openings 416 to mixing volume 418. A second acoustical signal is generated at the back surface of the transducer 404. The second acoustical signal travels from the back surface of the transducer 404 to the front volume 414 and through the front volume tuning channel 412 to mixing volume 418. The first acoustical signal and second acoustical signal are then mixed in mixing volume 418 and travel to the user's ear using the port provided by the mixing volume sound hole 420. The size of the mixing volume sound hole (or holes) is based upon the minimum size necessary to give a frequency response that does not have a bass-boost response as measured on a Type 1 sealed artificial ear.

The use of a passage or tuning channel as described herein provides a variety of options to a mobile device designer regarding the size, shape, location, and number of sound holes that must be used to obtain the desired frequency response necessary to achieve the optimum acoustical performance of the mobile device. One or more sound holes may be used and the placement of the holes is not directly dependent on the location of the transducer inside the mobile device.

Figure 5:
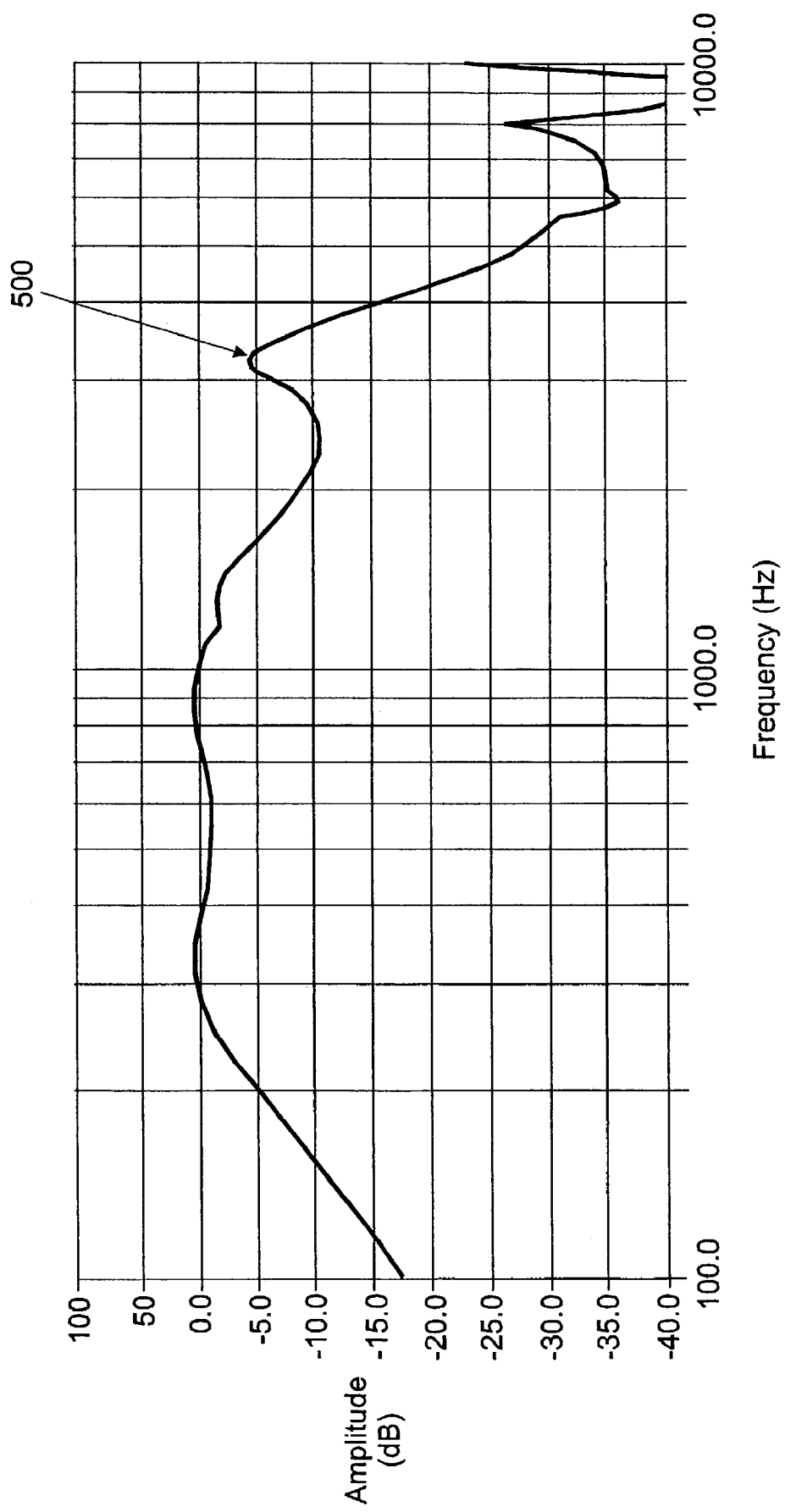
FIG. 5 is a graphical representation of the frequency response of a transducer implementation according to the present invention.

FIG. 5 is a graphical representation of the frequency response of a transducer implementation according to the present invention as measured on a low-leak Type 3.2 artificial ear with DRP-ERP frequency response correction. FIG. 5 shows the frequency response of the transducer implementation with the tuning channel as described above in connection with FIG. 3. Reference numeral 500 shows the resonance created by the correct tuning of the front volume 314 and the front volume tuning channel 312 (see FIG. 3).

As used herein, the term "mobile device" may include a cellular radiotelephone with or without a multi-line display, a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver.

Certain terminology is also used herein for convenience only and is not to be taken as a limitation on the invention. For example, words such as "front," "back," "top," "bottom," "side," "upper," and "lower" merely describe the configuration shown in the Figures. The components may be oriented in any direction and the terminology, therefore, should be understood as encompassing such variations unless specified otherwise. In addition, the terms "hole," "opening," and "port" are used interchangeably.

Specific embodiments of an invention are described herein. It is to be understood that the present invention is not limited to the example embodiments disclosed herein. One of ordinary skill in the telecommunications or acoustic arts will quickly recognize that the invention has other applications in other environments. In fact, many embodiments and implementations are possible. The following claims are in no way intended to limit the scope of the invention to the specific embodiments described above.

I claim:

1. A mobile radiotelephone device for porting an acoustical signal, the mobile radiotelephone device comprising:
   a housing having an interior surface and at least one opening for acoustically communicating with the interior of the housing;
   a transducer mounted within the housing of the mobile radiotelephone device for converting an electrical signal into an acoustical signal, the transducer having a first surface that emits a first acoustical signal; and a cavity forming member within the housing and engaging at least a portion of the interior surface of the housing and the transducer, including the first surface, to form an interior cavity defined by the cavity forming member, the interior surface of the housing, and the transducer, the cavity forming member defining a passage for acoustically coupling the interior cavity with the interior of the housing, wherein the first surface of the transducer emits the first acoustical signal into the interior cavity, the first acoustical signal travels out of the interior cavity through the passage and into the interior of the housing, and the only opening out of the interior cavity is the passage.

2. The mobile radiotelephone device of claim 1 wherein the transducer further includes a second surface that emits sound, wherein the second surface of the transducer emits a second acoustical signal into the interior of the housing that mixes with the first acoustical signal traveling from the interior cavity through the passage into the interior of the housing.

3. The mobile radiotelephone device of claim 1 further comprising an interior wall mounted within the housing for dividing the interior of the housing into a first housing interior cavity and a second housing interior cavity, wherein the transducer and the cavity forming member are located within the first housing interior cavity.

4. The mobile radiotelephone device of claim 3 wherein the at least one opening in the housing acoustically communicates with the first housing interior cavity.

5. The mobile radiotelephone device of claim 3 wherein the interior wall defines at least one opening for the acoustical signals to travel between the first housing interior cavity and the second housing interior cavity.

6. The mobile radiotelephone device of claim 1 wherein the cavity forming member is a grommet.

7. A mobile radiotelephone device for porting an acoustical signal, the mobile radiotelephone device comprising:
 a housing having an interior surface and at least one opening for acoustically communicating with the interior of the housing;
 a transducer mounted within the housing of the mobile radiotelephone device for converting an electrical signal into an acoustical signal, the transducer having a first surface that emits a first acoustical signal; and
 a cavity forming member within the housing and engaging at least a portion of the interior surface of the housing and the transducer, including the first surface, to form an interior cavity defined by the cavity forming member, the interior surface of the housing, and the transducer, the interior surface of the housing defining a passage for acoustically coupling the interior cavity with the interior of the housing, wherein the first surface of the transducer emits the first acoustical signal into the interior cavity, and the first acoustical signal travels out of the interior cavity through the passage and into the interior of the housing, and the only opening out of the interior cavity is the passage.

8. The mobile radiotelephone device of claim 7 wherein the transducer further includes a second surface that emits sound, wherein the second surface of the transducer emits a second acoustical signal into the interior of the housing that mixes with the first acoustical signal traveling from the interior cavity through the passage into the interior of the housing.

9. The mobile radiotelephone device of claim 7 further comprising an interior wall mounted within the housing for dividing the interior of the housing into a first housing interior cavity and a second housing interior cavity, wherein the transducer and the cavity forming member are located within the first housing interior cavity.

10. The mobile radiotelephone device of claim 9 wherein the at least one opening in the housing acoustically communicates with the first housing interior cavity.

11. The mobile radiotelephone device of claim 9 wherein the interior wall defines at least one opening for the acoustical signals to travel between the first housing interior cavity and the second housing interior cavity.

12. The mobile radiotelephone device of claim 7 wherein the cavity forming member is a grommet.

13. A mobile radiotelephone device for porting an acoustical signal, the mobile radiotelephone device comprising:
 a housing having an interior surface and at least one opening for acoustically communicating with the interior of the housing;
 an interior wall mounted within the housing for dividing the interior of the housing into a first housing interior cavity and a second housing interior cavity;
 a transducer mounted within the housing of the mobile radiotelephone device for converting an electrical signal into an acoustical signal, the transducer having a first surface that emits a first acoustical signal; and
 a cavity forming member within the housing and engaging at least a portion of the interior wall and the transducer, including the first surface, to form an interior cavity defined by the cavity forming member, the interior wall, and the transducer, the cavity forming member defining a passage for acoustically coupling the interior cavity with the interior of the housing, wherein the first surface of the transducer emits the first acoustical signal into the interior cavity, the first acoustical signal travels out of the interior cavity through the passage and into the interior of the housing, and the only opening out of the interior cavity is the passage.

14. The mobile radiotelephone device of claim 13 wherein the transducer further includes a second surface that emits sound, wherein the second surface of the transducer emits a second acoustical signal into the interior of the housing that mixes with the first acoustical signal traveling from the interior cavity through the passage into the interior of the housing.

15. The mobile radiotelephone device of claim 13 wherein the transducer and the cavity forming member are located within the first housing interior cavity.

16. The mobile radiotelephone device of claim 13 wherein the at least one opening in the housing acoustically communicates with the first housing interior cavity.

17. The mobile radiotelephone device of claim 13 wherein the interior wall defines at least one opening for the acoustical signals to travel between the first housing interior cavity and the second housing interior cavity.

18. The mobile radiotelephone device of claim 13 wherein the cavity forming member is a grommet.

19. A mobile radiotelephone device for porting an acoustical signal, the mobile radiotelephone device comprising:
 a housing having at least one opening for acoustically communicating with the interior of the housing;
 a transducer mounted within the housing of the mobile radiotelephone device for converting an electrical signal into an acoustical signal, the transducer having a first surface that emits a first acoustical signal; and
 a cavity forming member within the housing and engaging at least a portion of the transducer, including the first surface, to form an interior cavity defined by the cavity forming member and the transducer, the cavity forming member defining a passage for acoustically coupling the interior cavity with the interior of the housing, wherein the first surface of the transducer emits the first acoustical signal into the interior cavity, the first acoustical signal travels out of the interior cavity through the passage and into the interior of the housing, and the only opening out of the interior cavity is the passage.

20. A mobile radiotelephone device for porting an acoustical signal, the mobile radiotelephone device comprising:
    a housing having an interior surface and at least one opening for acoustically communicating with the interior of the housing;
    a transducer mounted within the housing of the mobile radiotelephone device for converting an electrical signal into an acoustical signal, the transducer having a first surface that emits a first acoustical signal;
    a cavity forming member within the housing and engaging at least a portion of the interior surface of the housing and the transducer, including the first surface, to form an interior cavity defined by the cavity forming member, the interior surface of the housing, and the transducer; and
    a passage within the housing for acoustically coupling the interior cavity with the interior of the housing, wherein the first surface of the transducer emits the first acoustical signal into the interior cavity, the first acoustical signal travels out of the interior cavity through the passage and into the interior of the housing, and the only opening out of the interior cavity is the passage.

21. A mobile radiotelephone device for porting an acoustical signal, the mobile radiotelephone device comprising:
    a housing having an interior surface and at least one opening for acoustically communicating with the interior of the housing;
    a transducer mounted within the housing of the mobile radiotelephone device for converting an electrical signal into an acoustical signal, the transducer having a first surface that emits a first acoustical signal, the transducer engaging at least a portion of the interior surface of the housing to form an interior cavity defined by the interior surface of the housing and the transducer including the first surface; and
    a passage within the housing for acoustically coupling the interior cavity with the interior of the housing, wherein the first surface of the transducer emits the first acoustical signal into the interior cavity, the first acoustical signal travels out of the interior cavity through the passage and into the interior of the housing, and the only opening out of the interior cavity is the passage.

22. A mobile radiotelephone device for porting an acoustical signal, the mobile radiotelephone device comprising:
    a housing having at least one opening for acoustically communicating with the interior of the housing;
    a transducer mounted within the housing of the mobile radiotelephone device for converting an electrical signal into an acoustical signal, the transducer having an interior cavity and an interior surface that emits a first acoustical signal, wherein the interior surface of the transducer emits the first acoustical signal into the interior cavity; and
    a passage within the housing for acoustically coupling the interior cavity with the interior of the housing, wherein the first acoustical signal travels out of the interior cavity only through the passage and into the interior of the housing and the only opening out of the interior cavity is the passage.

\* \* \* \* \*